(12) United States Patent
Feng et al.

(10) Patent No.: US 11,353,776 B2
(45) Date of Patent: Jun. 7, 2022

(54) LENS MODULE

(71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 294 days.

(21) Appl. No.: 16/794,503

(22) Filed: Feb. 19, 2020

(65) Prior Publication Data

US 2020/0310226 A1 Oct. 1, 2020

(30) Foreign Application Priority Data

Mar. 29, 2019 (CN) .......................... 201910248686.9

(51) Int. Cl.
*G02B 5/22* (2006.01)
*G03B 17/12* (2021.01)
*G02B 7/02* (2021.01)
*H04N 5/225* (2006.01)
*G02B 13/00* (2006.01)

(52) U.S. Cl.
CPC ............. *G03B 17/12* (2013.01); *G02B 5/22* (2013.01); *G02B 7/021* (2013.01); *G02B 7/026* (2013.01); *G02B 13/004* (2013.01); *H04N 5/2254* (2013.01)

(58) Field of Classification Search
CPC ............. G02B 13/004; G02B 13/0045; G02B 13/0035; G02B 13/0015; G02B 7/02; G02B 7/021; G02B 7/026; G02B 5/005; G02B 5/003; G02B 27/0018; H04N 5/2254; H04N 5/2253
See application file for complete search history.

(56) References Cited

U.S. PATENT DOCUMENTS

2014/0104691 A1* 4/2014 Chang ................ G02B 13/0035
                                                      359/611
2014/0368723 A1* 12/2014 Jung .................. G02B 13/0055
                                                      348/340

FOREIGN PATENT DOCUMENTS

| CN | 107482025 A | 12/2017 |
|----|-------------|---------|
| CN | 108073013 A | 5/2018 |
| CN | 108459388 A | 8/2018 |
| CN | 208351109 U | 1/2019 |
| TW | I649608 B | 2/2019 |

\* cited by examiner

*Primary Examiner* — Ephrem Z Mebrahtu
(74) *Attorney, Agent, or Firm* — ScienBiziP, P.C.

(57) ABSTRACT

A lens module includes a lens barrel, a lens group, and a soma. The soma includes a first end surface facing an object side and a second end surface facing an image side. An end point of the lens group closest to the object side is defined as an origin. An angle formed by a line connecting the origin to a point on the first end surface closest to an optical axis and the optical axis is defined as a first angle α. An angle formed by a line connecting the origin to a point on the second end surface closest to the optical axis and the optical axis is defined as a second angle β. The first angle α and the second angle β satisfy the following relationship: β>34.5° and α-β<0.4°.

16 Claims, 6 Drawing Sheets

LENS MODULE

FIELD

The subject matter herein generally relates to lens modules, and more particularly to a lens module applicable in an electronic device.

BACKGROUND

Generally, when a lens module captures an image under strong light conditions, light at a specific angle will enter the lens module and reflect into an image sensor of the lens module, which causes glare and affects an image quality.

In the related art, a portion of the light is blocked by setting a soma in the lens module, but a side wall of the soma reflects a portion of the light.

BRIEF DESCRIPTION OF THE DRAWINGS

Implementations of the present disclosure will now be described, by way of embodiments, with reference to the attached figures.

DETAILED DESCRIPTION

Figure 1:
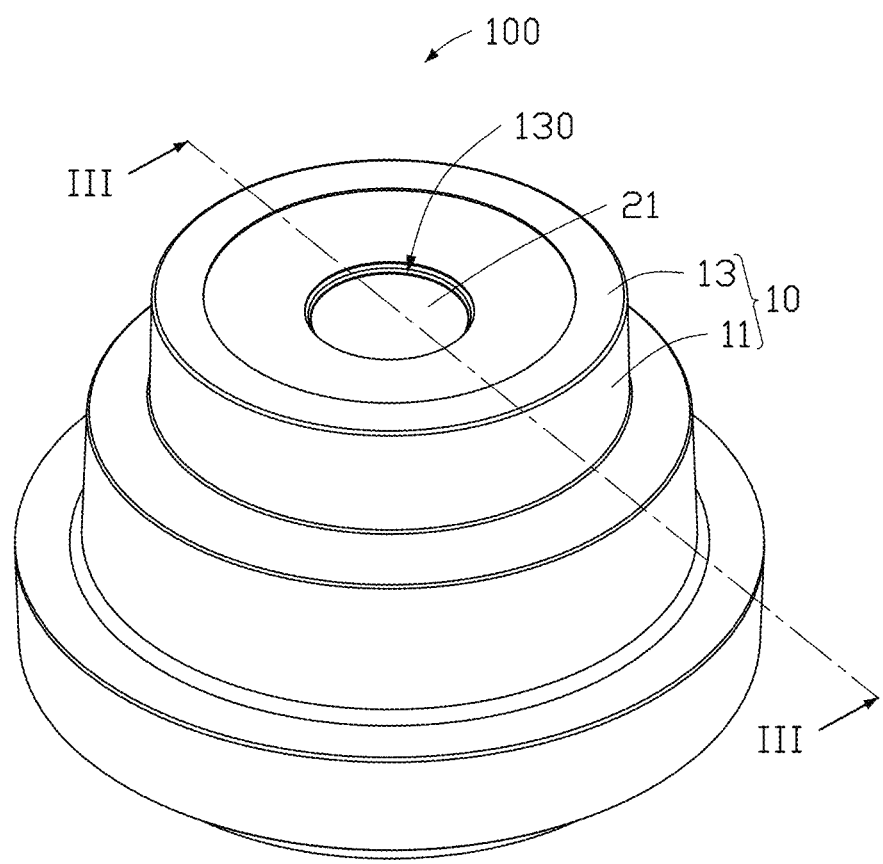
FIG. 1 is an assembled, isometric view of an embodiment of a lens module.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

FIG. 1 shows an embodiment of a lens module 100 applicable in an electronic device, such as a mobile phone, a tablet computer, a notebook computer, or the like.

Figure 2:
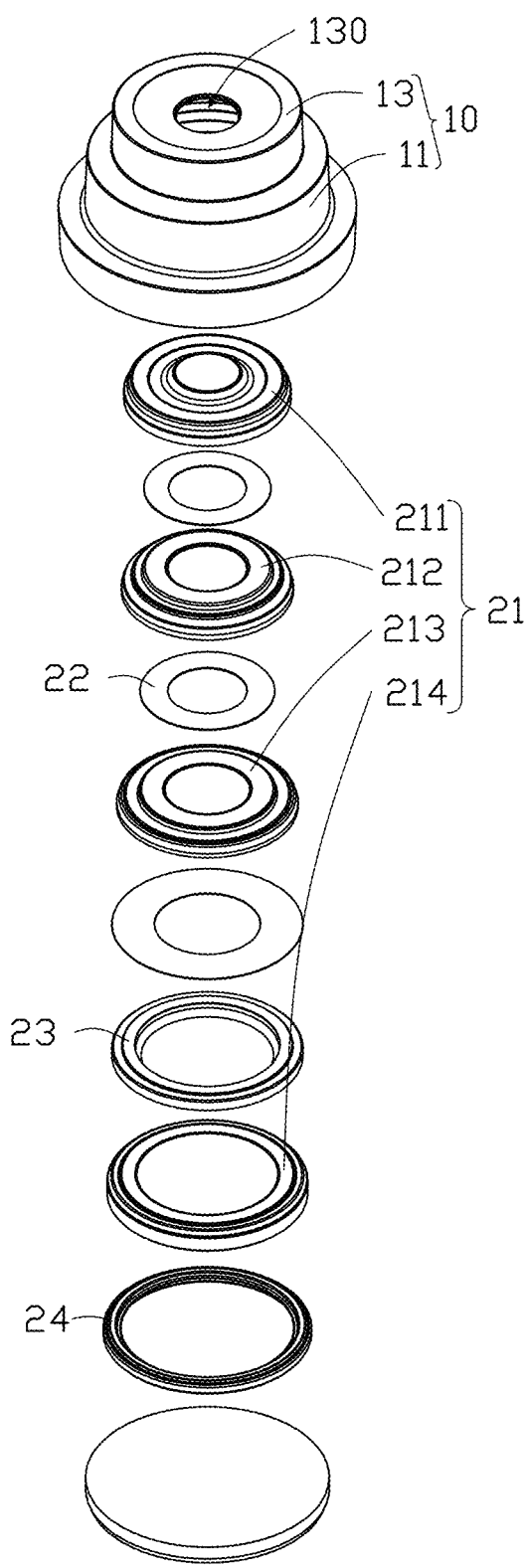
FIG. 2 is an exploded, isometric view of the lens module in FIG. 1.
Figure 3:
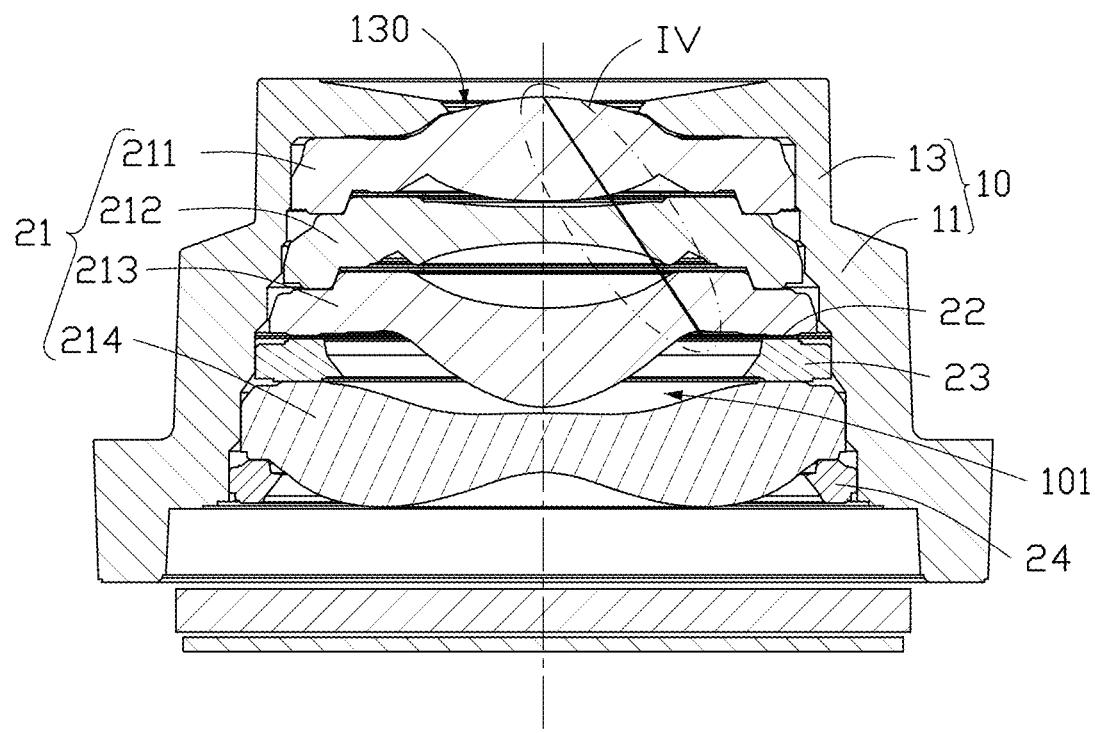
FIG. 3 is a cross-sectional view taken along line in FIG. 1.

Referring to FIG. 2 and FIG. 3, the lens module 100 includes a lens barrel 10, a lens group 21, a plurality of somas 22, a spacer 23, and a retainer 24. The lens group 21, the soma 22, the spacer 23, and the retainer 24 are located within the lens barrel 10.

The lens barrel 10 includes a peripheral wall 11 and a top wall 13 at one end of the peripheral wall 11. A receiving cavity 101 is cooperatively defined by the peripheral wall 11 and the top wall 13 to receive the lens group 21, the plurality of somas 22, the spacer 23, and the retainer 24.

An end of the peripheral wall 11 opposite the top wall 13 is fixed on a circuit board (not shown) inside the electronic device. The top wall 13 is located outside the electronic device. A light hole 130 is defined in a middle of the top wall 13. The light hole 130 communicates with the receiving cavity 101 to transmit external light.

The lens group 21 includes a first lens 211, a second lens 212, a third lens 213, and a fourth lens 214 sequentially stacked from an object side to an image side of the lens module 100. Each of the plurality of somas 22 may be located between any two adjacent lenses of the lens group 21.

It can be understood that, in other embodiments, the lens group 21 may include different numbers of lenses.

Figure 4:
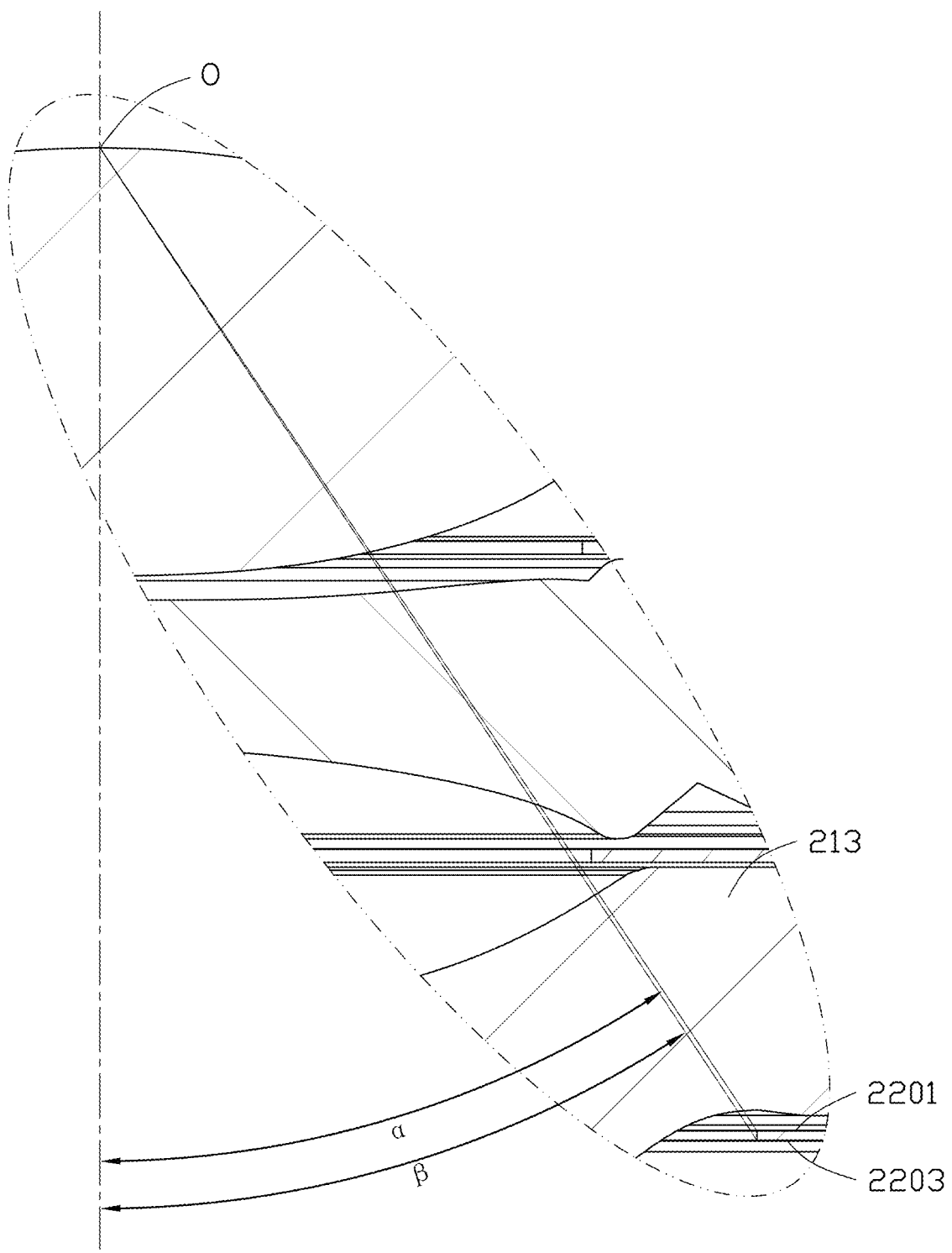
FIG. 4 is a partial cross-sectional view taken along line IV in FIG. 3.
Figure 6A:
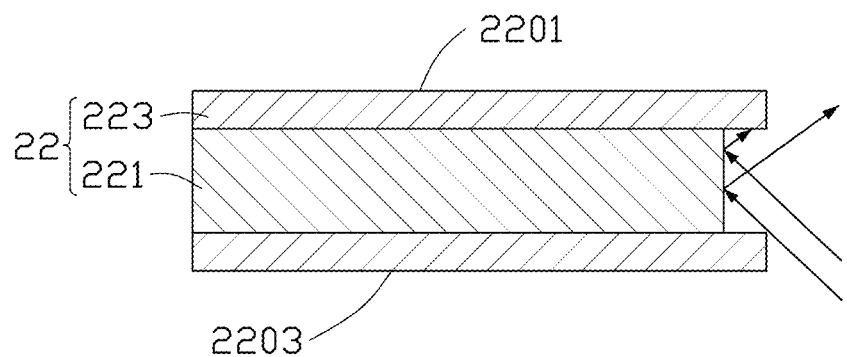
FIG. 6A is a structure of a soma in the lens module in FIG. 1.

Referring to FIG. 4 and FIG. 6A, each of the somas 22 is substantially annular and includes a first end surface 2201 and a second end surface 2203. The first end surface 2201 and the second end surface 2203 are oppositely disposed. The first end surface 2201 is disposed facing the object side, and the second end surface 2203 is disposed facing the image side.

An end point of the lens group 21 closest to the object side is defined as an origin O. The origin O is located on an optical axis of the lens module 100. An angle formed by an imaginary line connecting the origin O to a point on the first end surface 2201 closest to the optical axis and the optical axis is defined as a first angle α. An angle formed by an imaginary line connecting the origin O to a point on the second end surface 2203 closest to the optical axis and the optical axis is defined as a second angle β. The first angle α and the second angle β of at least one soma 22 satisfy the following relationship: β>34.5° and α-β<0.4°.

In one embodiment, the soma 22 satisfying the above relationship is located between the second lens 212 and the third lens 213, the first angle α is 35°, and the second angle β is 34.7°. In one embodiment, a thickness of the soma 22 is 0.16 mm.

Referring to FIG. 6A, each soma 22 includes a fixing layer 221 and two light absorption layers 223 respectively located on opposite sides of the fixing layer 221. The fixing layer 221 is made of polyethylene terephthalate (PET). The light absorption layer 223 is made of a carbon material. An inner diameter of the fixing layer 221 is greater than an inner diameter of the light absorption layers 223, so that an inner annular surface of the fixing layer 221 is recessed between the light absorption layers 223. When light is irradiated onto the inner annular surface of the fixing layer 221, a portion of the light is reflected onto and absorbed by the light absorption layers 223.

The spacer 23 is located between peripheral edge portions of the third lens 213 and the fourth lens 214 to maintain a predetermined interval between the third lens 213 and the fourth lens 214.

The retainer 24 is located on a side of the fourth lens 214 facing the image side for supporting and fixing the lens group 21 and blocking light.

Figure 5A:
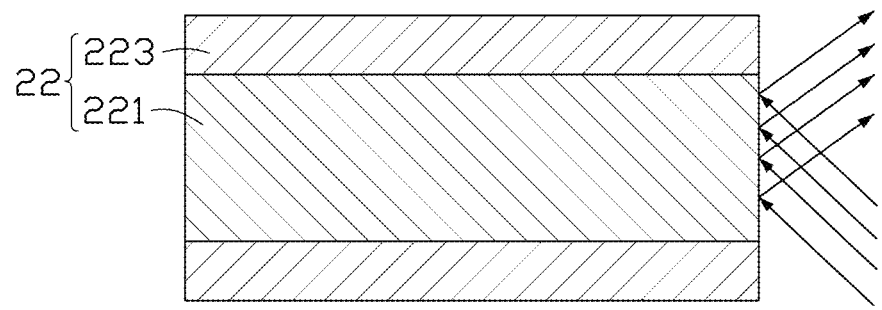
FIG. 5A is a structure of a soma in the related art.
Figure 5B:
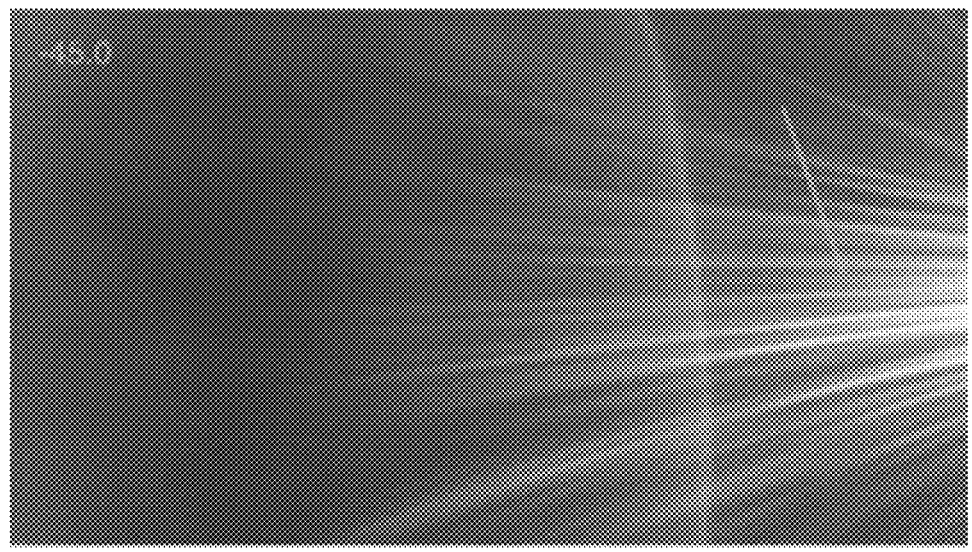
FIG. 5B is a photo taken by a lens module using the soma in FIG. 5A.
Figure 6B:
FIG. 6B is a photo taken by the lens module using the soma in FIG. 6A.

FIG. 5A and FIG. 5B respectively show a structure of a soma in the related art and a photo taken by a lens module using the soma in the related art. FIG. 6A and FIG. 6B respectively show a structure of the soma 22 in the present disclosure and a photo taken by the lens module 100 using the soma 22. By setting the first angle α and the second angle β of the soma 22 to satisfy the relationship: β>34.5° and α-β<0.4°, and by setting the size of the fixing layer 221 relative to the light absorption layers 223, the light absorption layers 223 can effectively absorb light to reduce the light reflected by a side wall of the soma 22. Thus, glare is reduced.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A lens module comprising:
   a lens barrel;
   a lens group located within the lens barrel; and
   at least one soma located between two lenses of the lens group; wherein:
   the at least one soma comprises a first end surface and a second end surface opposite the first end surface;
   the first end surface faces an object side of the lens module, and the second end surface faces an image side of the lens module;
   an end point of the lens group closest to the object side is defined as an origin;
   an angle formed by an imaginary line connecting the origin to a point on the first end surface closest to the optical axis and the optical axis is defined as a first angle α;
   an angle formed by an imaginary line connecting the origin to a point on the second end surface closest to the optical axis and the optical axis is defined as a second angle β; and
   the first angle α and the second angle β of the at least one soma satisfy the following relationship: β>34.5° and α-β<0.4°.

2. The lens module of claim 1, wherein:
   the at least one soma comprises a fixing layer and two light absorption layers respectively located on opposite sides of the fixing layer.

3. The lens module of claim 2, wherein:
   an inner diameter of the fixing layer is less than an inner diameter of the light absorption layers; and
   an inner annular surface of the fixing layer is recessed between the light absorption layers.

4. The lens module of claim 2, wherein:
   the fixing layer is made of polyethylene terephthalate; and
   the light absorption layer is made of a carbon material.

5. The lens module of claim 1, wherein:
   the lens group comprises a first lens, a second lens, a third lens, and a fourth lens sequentially stacked from the object side to the image side of the lens module; and
   the at least one soma is located between the second lens and the third lens.

6. The lens module of claim 5, wherein:
   the first angle α is 35°, and the second angle β is 34.7°.

7. The lens module of claim 5, wherein:
   a thickness of the soma is 0.16 mm.

8. The lens module of claim 5, further comprising a retainer, wherein:
   the retainer is adhered on a side of the fourth lens facing the image side; and
   the retainer supports and fixes the lens group in the lens barrel.

9. The lens module of claim 5, further comprising at least one spacer, wherein:
   the at least one spacer is located between two adjacent lenses of the lens group, the at least one spacer maintains a predetermined interval between the at least two adjacent lenses.

10. The lens module of claim 9, wherein:
    the at least one spacer is located between peripheral edge portions of the third lens and the fourth lens.

11. A lens module applicable in an electronic device, the lens module comprising:
    a lens barrel;
    a lens group composed of a plurality of lenses;
    a plurality of somas, each of the plurality of somas located between two lenses of the lens group;
    at least one spacer located between two adjacent lenses of the lens group, the at least one spacer maintaining a predetermined interval between the at least two adjacent lenses; and
    a retainer adhered on a side of the lens group facing the image side; wherein:
    the lens group, the plurality of somas, the at least one spacer, and the retainer are received within the lens barrel;
    each of the plurality of somas comprises a first end surface and a second end surface opposite the first end surface;
    the first end surface faces an object side of the lens module, and the second end surface faces an image side of the lens module;
    an end point of the lens group closest to the object side is defined as an origin;
    an angle formed by an imaginary line connecting the origin to a point on the first end surface closest to the optical axis and the optical axis is defined as a first angle α;
    an angle formed by an imaginary line connecting the origin to a point on the second end surface closest to the optical axis and the optical axis is defined as a second angle β; and
    the first angle α and the second angle β of at least one of the plurality of somas satisfy the following relationship: β>34.5° and α-β<0.4°.

12. The lens module of claim 11, wherein:
    the at least one soma comprises a fixing layer and two light absorption layers respectively located on opposite sides of the fixing layer.

13. The lens module of claim 12, wherein:
    an inner diameter of the fixing layer is less than an inner diameter of the light absorption layers; and
    an inner annular surface of the fixing layer is recessed between the light absorption layers.

14. The lens module of claim 13, wherein:
    the lens group comprises a first lens, a second lens, a third lens, and a fourth lens sequentially stacked from an object side to the image side of the lens module.

15. The lens module of claim 14, wherein:
    the first angle α is 35°, and the second angle β is 34.7°.

16. The lens module of claim 15, wherein:
a thickness of each of the plurality of somas is 0.16 mm.

\* \* \* \* \*